United States Patent
Paul (10) Patent No.: US 11,210,339 B1
(45) Date of Patent: Dec. 28, 2021

(54) TRANSIENT CONTEXTUAL MUSIC STREAMING

(71) Applicant: Facebook, Inc., Menlo Park, CA (US)

(72) Inventor: Debashish Paul, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 157 days.

(21) Appl. No.: 16/555,676

(22) Filed: Aug. 29, 2019

(51) Int. Cl.
*G06F 16/638* (2019.01)
*G06F 3/16* (2006.01)

(52) U.S. Cl.
CPC ............ *G06F 16/639* (2019.01); *G06F 3/165* (2013.01)

(58) Field of Classification Search
CPC ................................ G06F 16/639; G06F 3/165
See application file for complete search history.

(56) References Cited

U.S. PATENT DOCUMENTS

| | | |
|---|---|---|
| D392,267 S | 3/1998 | Mason et al. |
| D472,902 S | 4/2003 | Nashida et al. |
| D559,258 S | 1/2008 | Kita et al. |
| D588,151 S | 3/2009 | Okada |
| D606,080 S | 12/2009 | Marchie et al. |
| D616,463 S | 5/2010 | Barcheck et al. |
| D658,203 S | 4/2012 | Hally et al. |
| 8,572,169 B2 | 10/2013 | Partovi et al. |
| D696,269 S | 12/2013 | Hyunjung et al. |
| D713,851 S | 9/2014 | Wood |
| D715,314 S | 10/2014 | Wood |
| D716,822 S | 11/2014 | Wood |
| D723,044 S | 2/2015 | Park |
| 8,971,623 B2 | 3/2015 | Gatt et al. |
| D738,889 S | 9/2015 | Bailes et al. |
| 9,171,095 B1 | 10/2015 | Bilinski et al. |
| D759,680 S | 6/2016 | Behar |
| D760,267 S | 6/2016 | Butcher et al. |
| D760,759 S | 7/2016 | Butcher et al. |
| D761,268 S | 7/2016 | Oh et al. |
| D763,904 S | 8/2016 | Knapp et al. |
| D767,622 S | 9/2016 | Lee et al. |
| D770,495 S | 11/2016 | Knapp |
| D770,499 S | 11/2016 | Rodriguez |
| D770,500 S | 11/2016 | Rodriguez |
| D773,526 S | 12/2016 | Butcher et al. |
| D773,527 S | 12/2016 | Butcher et al. |

(Continued)

OTHER PUBLICATIONS

Preinterview First Office Action received for U.S. Appl. No. 16/595,267 dated Jul. 1, 2020, 35 pages.

(Continued)

*Primary Examiner* — Fan S Tsang
*Assistant Examiner* — David Siegel
(74) *Attorney, Agent, or Firm* — FisherBroyles, LLP (57) ABSTRACT

Systems and methods for creating and providing transient contextual queues of music through a music service may include (1) providing a user of a device with a music service, (2) detecting a current context of the user, the current context including a characteristic of the user's environment, (3) creating a transient contextual queue of music including music compositions that are tailored to the current context, and (4) playing, via the device one or more music compositions from the transient contextual queue of music while the user is detected to be within the current context. Various other methods, systems, and computer-readable media are also disclosed.

20 Claims, 7 Drawing Sheets

(56) References Cited

U.S. PATENT DOCUMENTS

| | | | |
|---|---|---|---|
| D773,534 S | 12/2016 | Yuk et al. |
| D774,053 S | 12/2016 | Kim et al. |
| D792,445 S | 7/2017 | Sun |
| D792,453 S | 7/2017 | Butcher et al. |
| D794,663 S | 8/2017 | Sakuma |
| D803,239 S | 11/2017 | Yuk et al. |
| D814,515 S | 4/2018 | Guzman et al. |
| D819,683 S | 6/2018 | Zhang et al. |
| D829,759 S | 10/2018 | Clapper et al. |
| D831,062 S | 10/2018 | Chen |
| D831,066 S | 10/2018 | Takita et al. |
| 10,175,757 B2 | 1/2019 | Missig et al. |
| 10,270,983 B1 | 4/2019 | Van Os et al. |
| D851,111 S | 6/2019 | Dye et al. |
| D852,210 S | 6/2019 | Wei |
| D853,410 S | 7/2019 | Barnett et al. |
| 10,490,026 B2 | 11/2019 | Bryant et al. |
| D868,811 S | 12/2019 | Jeon et al. |
| 10,496,705 B1 | 12/2019 | Irani et al. |
| D874,497 S | 2/2020 | Krenkler et al. |
| D874,498 S | 2/2020 | Krenkler et al. |
| D874,499 S | 2/2020 | Krenkler et al. |
| D874,500 S | 2/2020 | Krenkler et al. |
| D877,193 S | 3/2020 | Li et al. |
| 10,623,621 B2 | 4/2020 | Li et al. |
| D889,478 S | 7/2020 | Rotgans et al. |
| D890,188 S | 7/2020 | Anno et al. |
| D892,855 S | 8/2020 | Liu |
| D895,649 S | 9/2020 | Jetly et al. |
| 10,783,320 B2 | 9/2020 | Jon et al. |
| 10,803,160 B2 | 10/2020 | Tussy |
| D900,845 S | 11/2020 | Tomori |
| D902,242 S | 11/2020 | Assaf et al. |
| 10,911,504 B1 | 2/2021 | Paul |
| 2005/0038819 A1 | 2/2005 | Hicken et al. |
| 2008/0122796 A1 | 5/2008 | Jobs et al. |
| 2009/0182736 A1 | 7/2009 | Ghatak |
| 2009/0262087 A1 | 10/2009 | Kim |
| 2009/0319356 A1 | 12/2009 | Spitzer et al. |
| 2010/0049702 A1 | 2/2010 | Martinez et al. |
| 2010/0192105 A1 | 7/2010 | Kim et al. |
| 2011/0267530 A1 | 11/2011 | Chun |
| 2012/0054666 A1 | 3/2012 | Baird-Smith et al. |
| 2012/0303711 A1 | 11/2012 | Park |
| 2012/0323938 A1 | 12/2012 | Skeen et al. |
| 2013/0073983 A1 | 3/2013 | Rasmussen et al. |
| 2013/0182138 A1 | 7/2013 | Cho |
| 2013/0198268 A1 | 8/2013 | Hyman |
| 2013/0218721 A1 | 8/2013 | Borhan et al. |
| 2014/0031961 A1* | 1/2014 | Wansley | H04W 4/021 700/94 |
| 2015/0127748 A1 | 5/2015 | Buryak |
| 2015/0148106 A1 | 5/2015 | Choi et al. |
| 2015/0186454 A1 | 7/2015 | Kim |
| 2015/0264169 A1 | 9/2015 | Yim et al. |
| 2016/0034970 A1 | 2/2016 | Musil et al. |
| 2016/0205340 A1 | 7/2016 | Jang et al. |
| 2016/0226804 A1 | 8/2016 | Hampson et al. |
| 2016/0292269 A1* | 10/2016 | O'Driscoll | G06F 16/636 |
| 2017/0068910 A1 | 3/2017 | Burroughs |
| 2017/0109642 A1 | 4/2017 | Kawale et al. |
| 2018/0189391 A1 | 7/2018 | Ip et al. |
| 2018/0224990 A1 | 8/2018 | Shim et al. |
| 2019/0050128 A1 | 2/2019 | Lee |
| 2019/0080066 A1 | 3/2019 | Van Os et al. |
| 2019/0215449 A1 | 7/2019 | Chun et al. |
| 2019/0238646 A1 | 8/2019 | Edwards et al. |
| 2020/0004495 A1* | 1/2020 | Dundar | G06F 16/4387 |
| 2020/0042554 A1* | 2/2020 | Liu | G06F 16/687 |
| 2020/0089724 A1 | 3/2020 | Zimovnov et al. |
| 2020/0117340 A1 | 4/2020 | Amitay et al. |
| 2020/0241746 A1 | 7/2020 | Chen et al. |
| 2020/0267267 A1 | 8/2020 | Kim et al. |
| 2021/0089574 A1 | 3/2021 | Paul |

OTHER PUBLICATIONS

First Action Interview received for U.S. Appl. No. 16/595,267 dated Sep. 2, 2020, 36 pages.

Preinterview First Office Action received for U.S. Appl. No. 16/574,376 dated Sep. 4, 2020, 22 pages.

Zhang et al., "Siamese Style Convolution Neural Networks for Sound Search by Vocal Imitation", IEEE/ACM Transactions on Audio, Speech, and Language Processing, vol. 27, No. 2, Sep. 3, 2018, pp. 1-13.

Spotify, "Daily Mix", URL: https://support.spolify.com/us/using_spotify/discover_music/daily-mix/, as accessed Oct. 21, 2019, pp. 1-3.

Non-Final Office Action received for U.S. Appl. No. 16/555,690 dated Jul. 9, 2020, 20 pages.

Notice of Allowance received for U.S. Appl. No. 16/555,690 dated Oct. 5, 2020, 20 pages.

Cao et al., "Systems and Methods for Feature-Based Music Selection", U.S. Appl. No. 16/574,379 filed Sep. 18, 2019, 46 pages.

Paul, Debashish, "System and Methods for Digitally Proximity-Based Music Stations", U.S. Appl. No. 16/657,008, filed Oct. 18, 2019, 55 pages.

Paul, Debashish, "System and Methods for Digitally Fetching Music Content", U.S. Appl. No. 16/581,812, filed Sep. 25, 2019, 44 pages.

First Action Interview received for U.S. Appl. No. 16/574,376 dated Feb. 4, 2021, 27 pages.

Final Office Action received for U.S. Appl. No. 16/595,267 dated Feb. 24, 2021, 54 pages.

Non-Final Office Action received for U.S. Appl. No. 29/706,940 dated Jan. 25, 2021, 23 pages.

"QR code scanning icon stock illusli ation", URL: https://www.istockphoto.com/vector/qr-code-scanning-icon-gm1158288755-316352859, istockphoto.com, Jun. 26, 2019, pp. 1-3.

Non-Final Office Action received for U.S. Appl. No. 29/706,941 dated Jan. 25, 2021, 23 pages.

Hardwick, Tim, "How to Sign Up for Apple Music", URL: https://www.macrumors.com/how-to/sign-up-for-apple-music/, macrumors.com, Feb. 13, 2019, pp. 1-4.

Final Office Action received for U.S. Appl. No. 16/574,376 dated Jul. 15, 2021, 43 pages.

* cited by examiner

TRANSIENT CONTEXTUAL MUSIC STREAMING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

People all over the world feel a need for music. The type of music an individual needs may be mercurial, shifting depending on context. For example, an individual may feel a need for one type of music when driving with friends but a different type of music when studying for an exam or reflecting on a sad emotion. With the mobility of devices in modernity (e.g., smart phones, mobile speakers, tablets, laptops, etc.), modern music services provide music ubiquitously, giving a user the potential for music consumption as the user advances through various contexts throughout the day.

However, the traditional modern music service does not take a user's shifting context into account when providing suggestions for music consumption. Rather, music is organized for a user (e.g., in playlists and/or music stations) based on content previously added by the user, listened to by the user, and/or designated as liked by the user. If a user wishes to consume music tailored to a particular context, the user must browse through the playlists and/or stations and/or a corpus of new music to manually identify and select music that is appropriate for the user's current context. At times, an individual may feel that the cost of intentionally identifying and browsing to music that is well-suited to a context (e.g., the time and/or effort to do so) may outweigh the perceived benefit. Or, an individual may not stop to think of the benefit of adding music to a current context. Responding to this, the present disclosure identifies a need for improved systems and methods for automatically providing a user of a music service with music suggestions that have been tailored to the user's current context.

As will be described in greater detail below, embodiments of the present disclosure may provide systems and methods for creating transient contextual queues of music. In some examples, the transient contextual queues of music may be provided by a music service operating within a social media platform. Each contextual queue of music may include a ready-made curated playlist created for a specific context. Such contexts may include, for example, an activity (e.g., running), a state (e.g., driving), a date and/or time (e.g., a holiday), and/or an event (e.g., the birthday of a famous artist).

In some examples, a contextual music station may be created in response to a device detecting one or more smart triggers indicative of a context. Additionally or alternatively, the contextual music station may be created in response to information collected from a social media application and/or a third-party application installed on the device.

In some examples, the context may include a sociality (e.g., a person or group of people a user is with). In these examples, the corresponding contextual queue of music may include music known and/or predicted to be enjoyed by each person identified as being with the user. In one embodiment, the context may include a location (e.g., a country). In one such embodiment, the music service may detect that a user has arrived at a new geographic area and may create a contextual music station of music being listened to by other users in the area.

In some embodiments, the music service may provide a transient contextual entry point within a user interface, which may navigate to the contextual queue of music. In these embodiments, each contextual entry point may represent a mini built-in media player, which may toggle between an active state (e.g., a full-screen mode) and passive state (e.g., a minimized-screen mode). Additionally or alternatively, the face of a persistent music entry point may be temporarily altered to reflect the transient contextual queue of music and the persistent music entry point may navigate to the contextual queue of music while the face is altered.

As will be explained in greater detail below, embodiments of the present disclosure may improve systems for music content selection, allowing computer-based selection models to automatically select music that is more meaningful for a user compared with music selection systems that do not take context into account. The present disclosure may improve the functioning of a computer itself by improving data selection performed by computers. This may also improve the field of heuristic-based music selection, by improving a classifier trained to identify music predicted to be of interest to a user.

Figure 1:
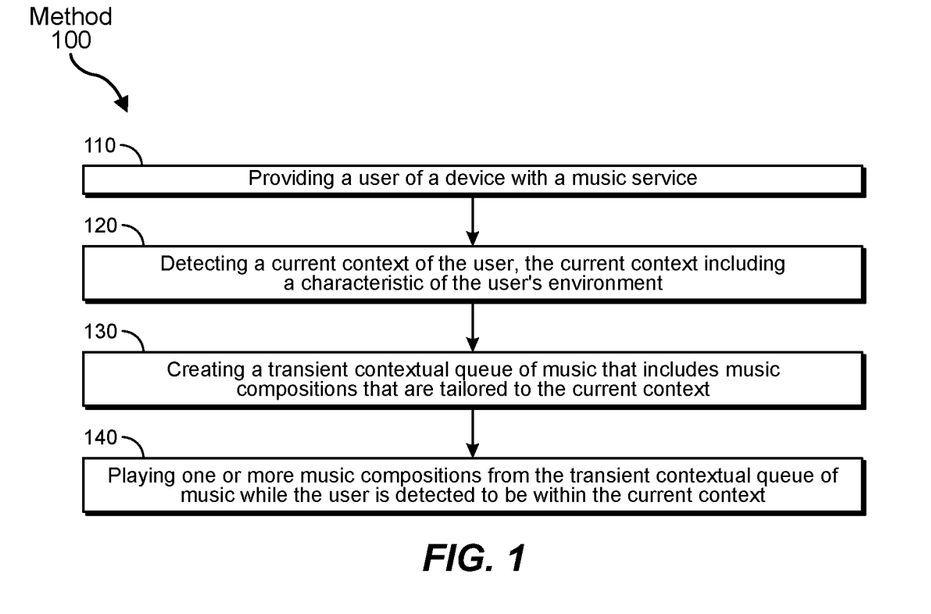
FIG. 1 is a flow diagram of an exemplary method for creating transient contextual queues of music.

The following will provide, with reference to FIG. 1, detailed descriptions of computer-implemented methods for creating and maintaining a transient contextual queue of music corresponding to a user's transient context. Detailed descriptions of corresponding example systems will also be provided in connection with FIG. 2. Detailed descriptions of an exemplary persistent entry point that navigates to an interface of a music service will be provided in connection with FIG. 3A. Detailed descriptions of an exemplary persistent entry point with an icon that has been temporarily altered to correspond to a transient contextual queue of music will be provided in connection with FIG. 3B. Detailed descriptions of exemplary transient entry points (e.g., push notifications) will be provided in connection with FIG. 4. Finally, detailed descriptions of an exemplary player interface, which is superimposed over a newsfeed, will be provided in connection with FIGS. 5A-5D.

FIG. 1 is a flow diagram of an exemplary computer-implemented method 100 for creating transient contextual queues of music. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at providing music to users of a music service. In some examples, server 202 may perform music functions in conjunction with a social media platform 206 that provides a music service to its users. Although illustrated as a single entity in FIG. 2, server 202 may include and/or represent a group of multiple servers that operate in conjunction with one another.

Figure 2:
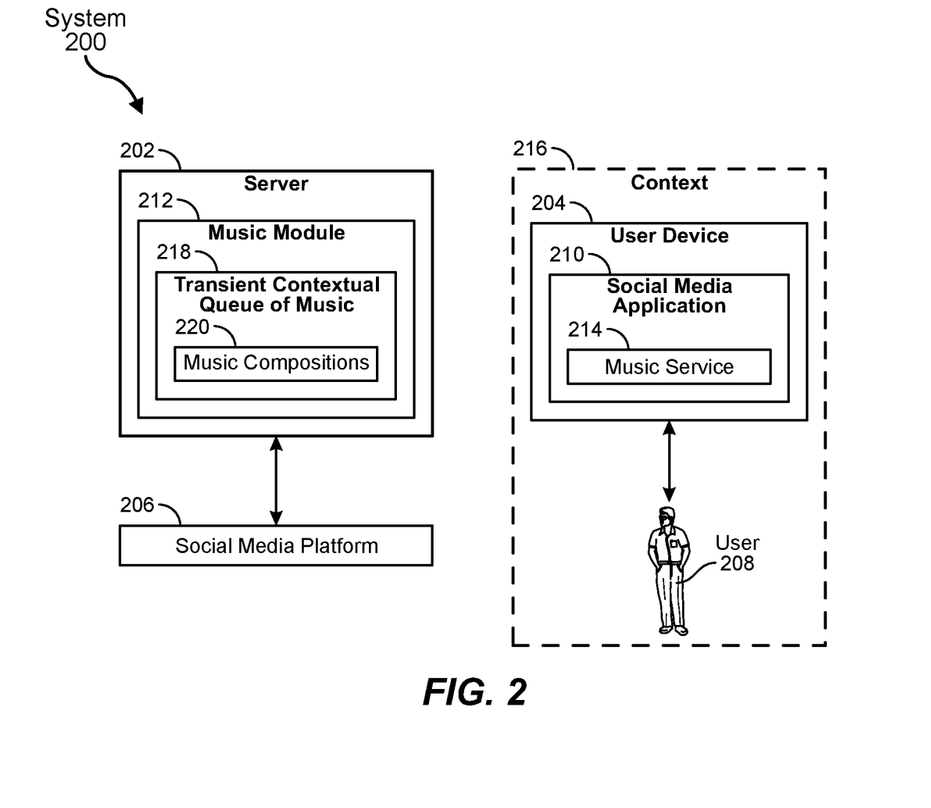
FIG. 2 is a block diagram of an exemplary system for creating transient contextual queues of music.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc. In some examples, a user 208 of user device 204 may be a user of a music service operating in conjunction with server 202.

In examples in which this music service is provided by social media platform 206, user 208 may be a member of social media platform 206 and user device 204 may have installed an instance of a social media application 210 that operates as part of the social media platform 206. Additionally or alternatively, user device 204 may have installed a browser that may navigate to one or more webpages maintained by social media platform 206. In these examples, social media platform 206 may maintain a profile for each user, which may include a variety of information (e.g., a current city, a workplace, a school, a hometown, etc.). Additionally, social media platform 206 may maintain a database of user 208's contacts, which have been added via social media platform 206.

Social media platform 206 may provide a variety of services (e.g., in addition to a music service) for the users within its network (e.g., user 208). In one example, social media platform 206 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or a link to an online article.

As another example, social media platform 206 may provide a digital story service. The digital story service may provide users with a story consumption channel, which presents a continuous series of digital story compositions to a story-consumer, one by one. In one example, the story consumption channel may transition from presenting one digital story composition to the next automatically, without requiring any user input to do so. In some examples, a digital story composition may only be viewable for a predetermined amount of time. For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and/or posted by a same user) may be grouped together within the story consumption channel, such that each digital story composition from a particular source is displayed prior to displaying digital story compositions from another source.

As another example, social media platform 206 may provide a messaging service. The term "messaging service" may generally refer to any type or form of digital message delivery system that enables users of social media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

Returning to FIG. 1, at step 110, one or more of the systems described herein may provide a user of a device with a music service. For example, as illustrated in FIG. 2, a music module 212 may provide user 208 of user device 204 with a music service 214.

The term "music service" may generally refer to any type or form of service that provides music. In some examples, music service 214 may represent a web-based service that streams music to a device that is online (that is, connected to a network such as the Internet). In one such example, music service 214 may additionally provide music when the device is offline (that is, when the device is disconnected from the network). For example, music service 214 may enable music to be downloaded for a designated amount of time.

Music service 214 may provide music in a variety of ways. In one example, music service 214 may provide music in response to a direct user request. For example, music service 214 may receive a user request for a particular music composition and may play the requested music composition in response to receiving the request. In another example, music service 214 may create and/or maintain one or more playlists and/or music stations for user 208.

The term "playlist" may refer to a set of selected music compositions. In some instances, the set of selected music compositions may correspond to a particular genre and/or theme. Music module 212 may create a playlist within music service 214 in a variety of ways.

In one embodiment, music module 212 may create a playlist based on user input. In this embodiment, music module 212 may enable user 208 to create a user-generated playlist by manually uploading each music composition user 208 wishes to include in the playlist and, in some examples, assigning a name to the playlist.

In an additional or alternative embodiment, music module 212 may create a playlist automatically (e.g., based on one or more deduced user preferences). Music module 212 may deduce user 208's preferences in a variety of ways. In one embodiment, music module 212 may deduce the preferences based on user 208's listening history (e.g., songs selected, listened to, and/or designated as liked by user 208 in the past). In one embodiment, which will be discussed in greater detail below in connection with step 130, the contents of a playlist may be based in part on a current context of user 208.

The term "music station" may refer to an evolving queue of music compositions, which are continually added to the evolving queue in real time (e.g., as the music compositions within the evolving queue are being played). In one example, the evolving queue may be filled with music compositions that correspond to a particular genre of music and/or that relate to a common theme.

Music module 212 may create a music station in a variety of ways. In one embodiment, music service 214 may create a music station based on an initial user input (e.g., a user request to play music compositions that relate to a particular genre, music composition, artist, and/or theme). In another embodiment, music service 214 may create a music station automatically (that is, without user input initiating the creation of the music station). For example, as will be discussed in greater detail below in connection with step 130, music module 212 may create a music station automatically in response to detecting a particular context. Music module 212 may determine which music compositions to include in a music station's evolving queue based on a variety of factors, such as user preference, an initial user input received from user 208, and/or a current context of user 208, as will be discussed in greater detail below in connection with step 130.

Music service 214 may operate in various modes. For example, music service 214 may function in an active mode, which enables active music discovery. In this example, music service 214 may enable user 208 to actively search for music to consume. In another example, music service 214 may function in a passive mode, which enables ambient music discovery. In this example, music service 214 may provide user 208 with music that user 208 has not specifically searched for (e.g., by providing an automatically generated playlist and/or music station). In a passive mode, music service 214 may (1) automatically create a playlist and/or music station and (2) automatically provide a push notification with a suggestion to consume the automatically created playlist and/or music station.

In some examples, as discussed above, user 208 may be a member of social media platform 206 and music service 214 may be provided as part of social media platform 206 (e.g., as part of social media application 210). Music service 214 may operate within social media platform 206 in a variety of ways. In one embodiment, music service 214 may operate as a passive layer that operates in the background of another service provided by social media platform 206 and/or as a supplemental feature of another service provided by social media platform 206.

For example, music service 214 may operate as a passive layer within a digital story service and/or a newsfeed service. As a specific example, a composition interface that enables user 208 to create a digital story and/or a newsfeed composition may include a selectable element that enables user 208 to add music to the digital story and/or newsfeed composition. In another example, music service 214 may operate as a passive layer within a messenger service. In this example, a messenger interface that enables user 208 to create private messages may include a selectable element that enables user 208 to share music in the private message. As illustrated in each of these examples, providing music service 214 as a passive layer within social media platform 206 may enable the social sharing of music.

Figure 5A:
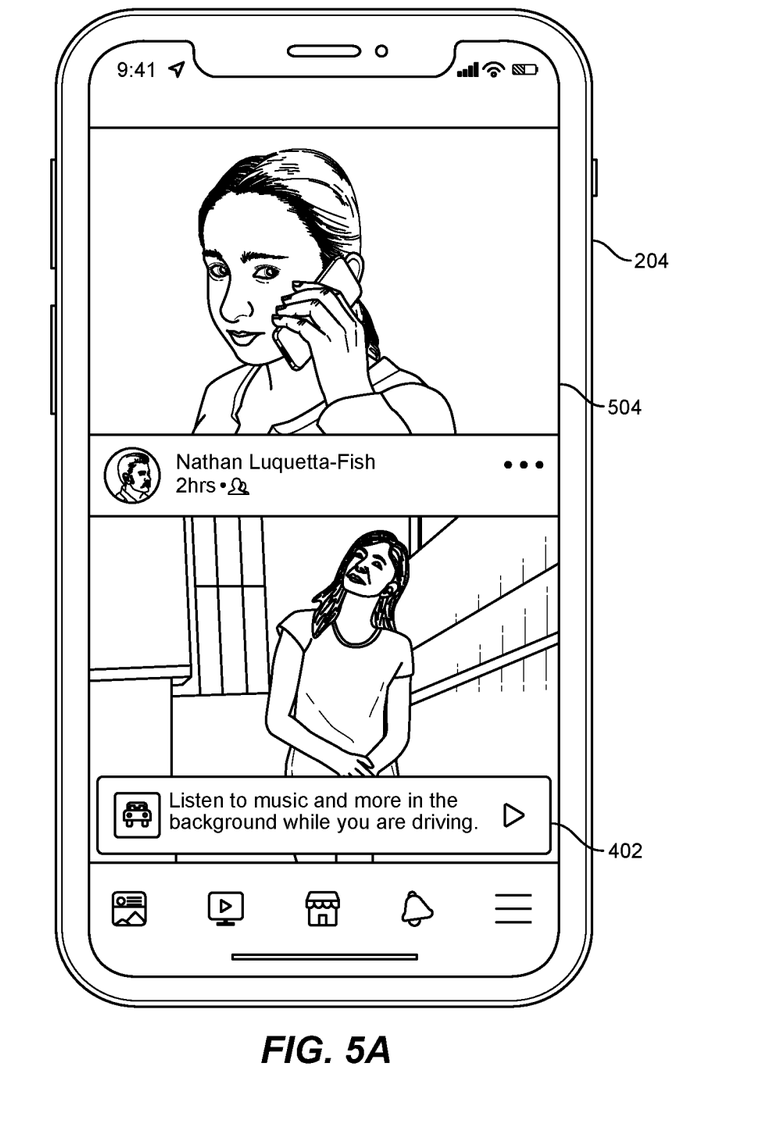
FIG. 5A is an illustration of an exemplary transient entry point from FIG. 4 superimposed over a newsfeed.
Figure 5B:
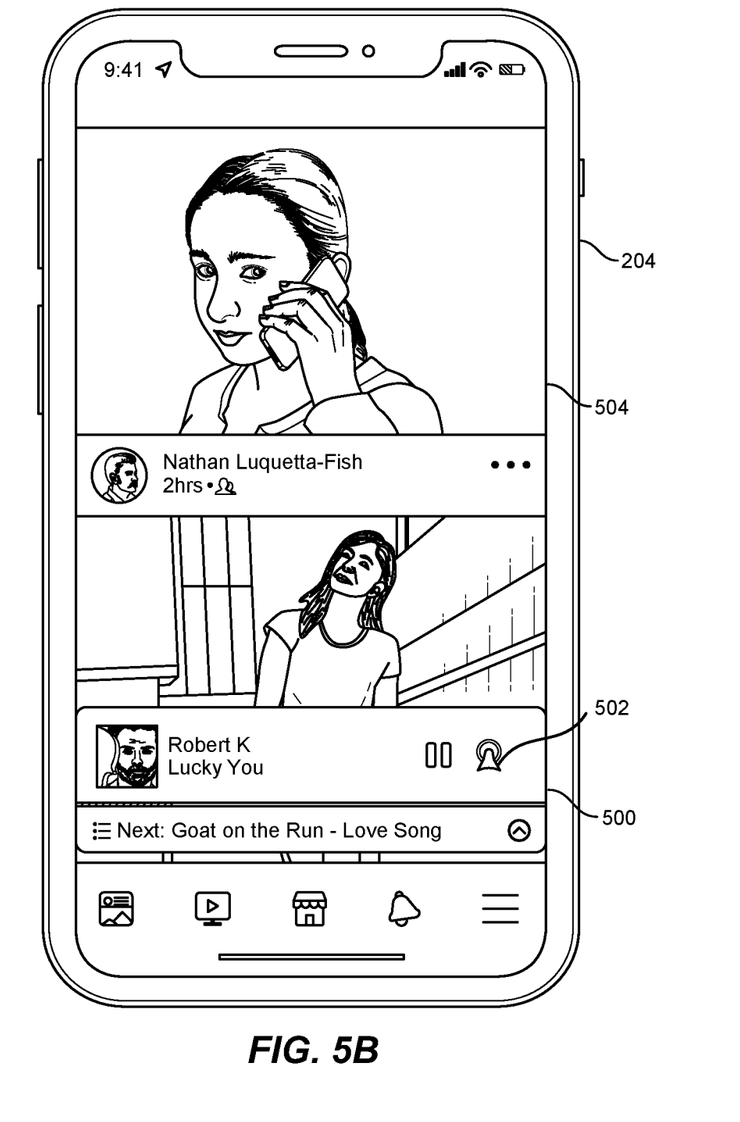
FIG. 5B is an illustration of an exemplary contextual music player, corresponding to the transient entry point depicted in FIG. 5A, which is superimposed over a newsfeed.
Figure 5C:
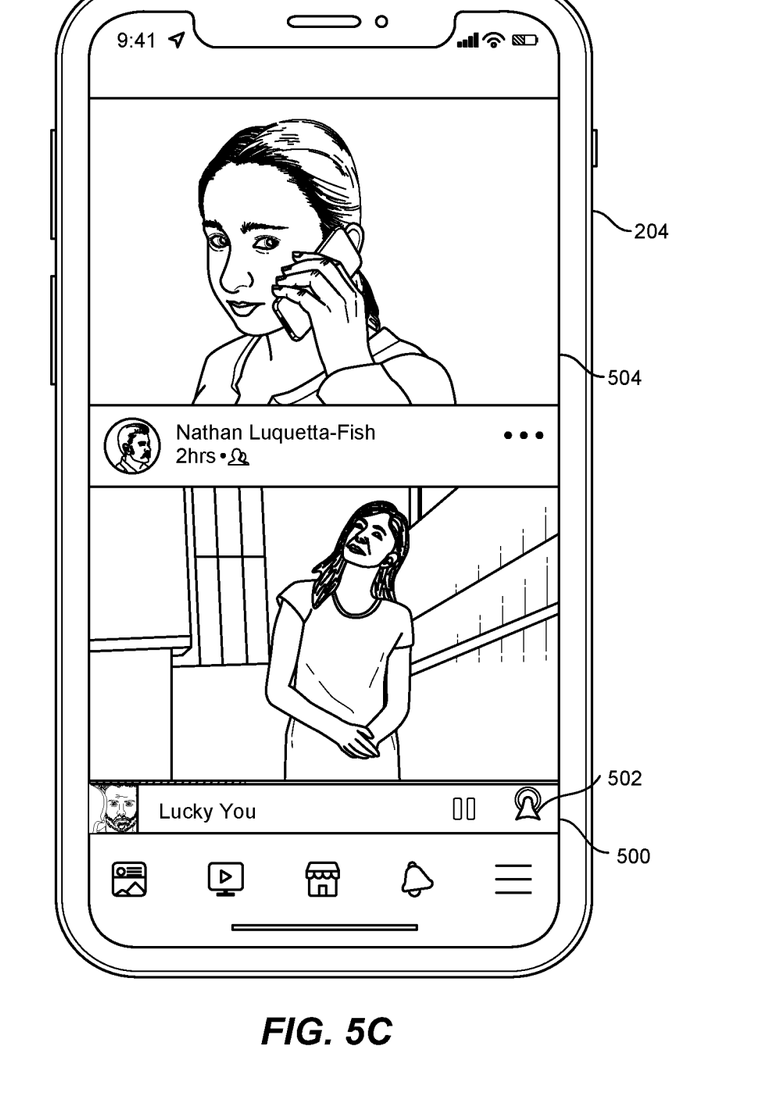
FIG. 5C is an illustration of the exemplary contextual music player depicted in FIG. 5B, which has been minimized.
Figure 5D:
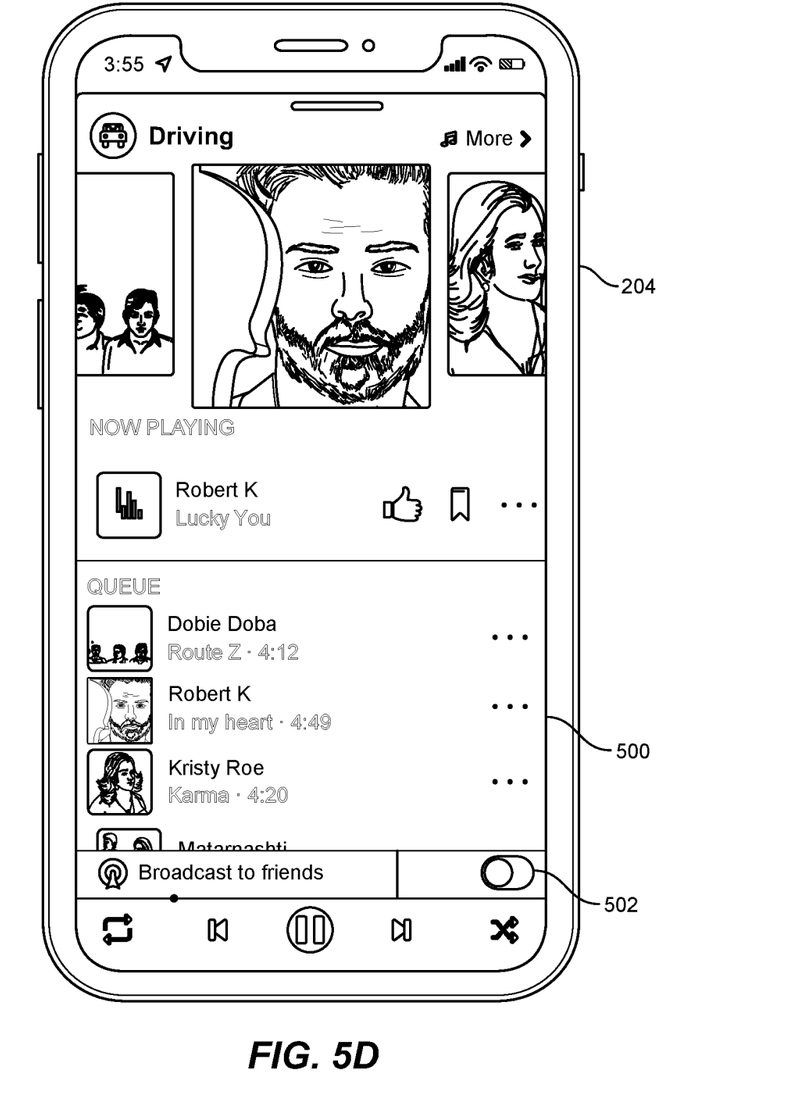
FIG. 5D is an illustration of the exemplary contextual music player depicted in FIGS. 5B and 5C, which has been displayed in a full-screen mode.

In addition, or as an alternative, to operating as a passive layer within social media platform 206, music service 214 may operate as part of an active layer within social media platform 206 (e.g., within an active layer interface or set of active-layer interfaces dedicated to music consumption and/or sharing). The active layer interface may represent any type or form of interface dedicated to music consumption and/or sharing. In some examples, the active layer interface may represent a player interface corresponding to a music player. Player interface 500 in FIG. 5D provides one specific example of an active layer player interface. Additionally or alternatively, the active layer player interface may represent an informational interface (e.g., a music digest page and/or current music events page).

Figure 3A:
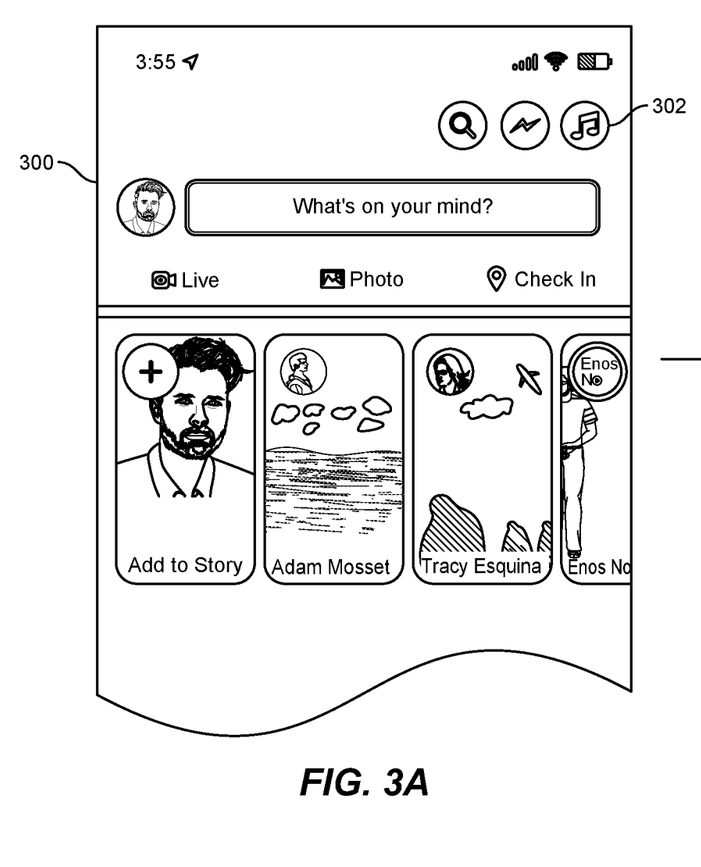
FIG. 3A is an illustration of an exemplary persistent entry point that navigates to an interface of a music service.
Figure 3B:
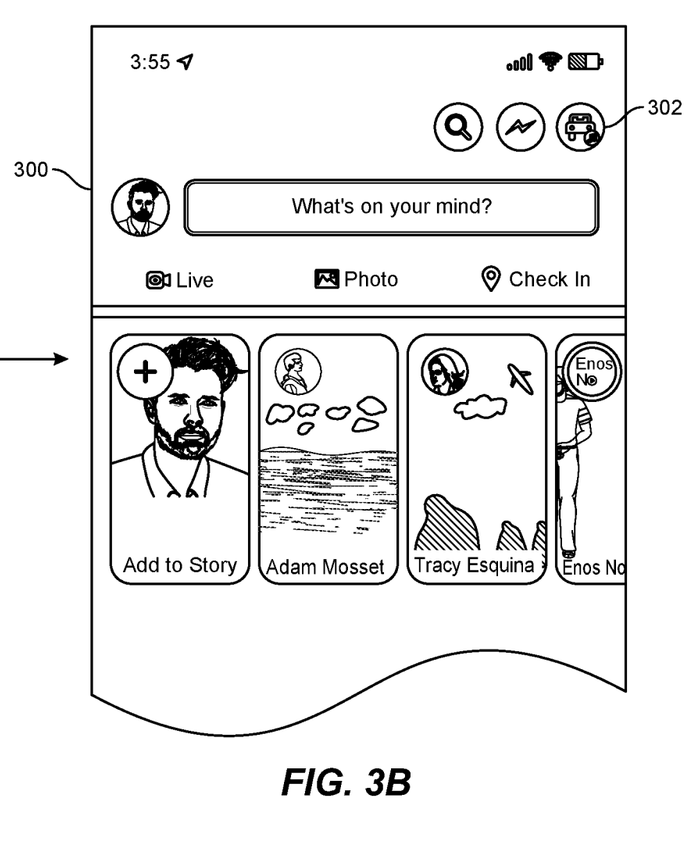
FIG. 3B is an illustration of the exemplary persistent entry point depicted in FIG. 3A, with an icon that has been temporarily altered to correspond to a transient contextual queue of music.

Social media platform 206 may provide various entry points that navigate to the active layer interface (e.g., from a landing interface and/or an interface associated with other services provided by social media platform 206). For example, as illustrated in FIGS. 3A-3B, a landing interface 300 may include a persistent entry point 302, which may be permanently affixed to its position within landing interface 300, that navigates to an active layer interface.

In some embodiments, an active layer interface dedicated to music consumption may include a selectable broadcasting element. For example, player interface 500 in FIG. 5D may include a broadcasting element 502. In these embodiments, music module 212 may be configured to broadcast the music content consumed by user 208 while broadcasting element 502 is selected. In some examples, music service 214 may enable user 208 to select an audience to which the music content will be broadcasted (e.g., a public audience, a contacts-only audience, etc.).

Returning to FIG. 1, at step 120, one or more of the systems described herein may detect a current context of the user (e.g., by detecting a characteristic of the user's environment). For example, as illustrated in FIG. 2, music module 212 may detect a current context 216 of user 208 (e.g., by detecting a characteristic of user 208's environment).

The term "context" may generally refer to any type or form of internal or external environment, setting, and/or circumstance of user 208. Context 216 may refer to a global context (e.g., a holiday, season, public event, current event, music event, etc.), a social context (e.g., a social setting of user 208), and/or a personal context (e.g., an activity in which user 208 is engaged, an internal state of user 208 such as a mood and/or emotion, an event being attended by user 208, a location of user 208, etc.).

Music module 212 may detect context 216 in a variety of ways. In some examples, music module 212 may detect context 216 based on a characteristic of context 216 (e.g., a smart trigger) identified by a sensor of user device 204. For example, music module 212 may rely on a GPS sensor, embedded within and/or communicatively coupled to user device 204, to identify GPS coordinates corresponding to a current location of user device 204. Then, music module 212 may identify the current location of user 208 based on the GPS coordinates identified by the GPS sensor.

As another example, music module 212 may rely on a Bluetooth sensor, embedded within and/or communicatively coupled to user device 204, to identify one or more ambient device parings. Then, music module 212 may deduce that the identified ambient device pairings are indicative of a location and/or activity of user 208. For example, music module 212 may deduce that user 208 is driving in a car if user device 204 is paired with a car speaker.

As another example, music module 212 may rely on an accelerometer sensor, embedded within and/or communicatively coupled to user device 204, to identify a motion of user device 204. Then, music module 212 may deduce that the identified motion is indicative of a motion of user 208 and identify an activity that user 208 is engaged in (e.g., running, walking, driving) based on user 208's deduced motion. As another example, music module 212 may rely on an ambient light sensor, embedded within or communicatively coupled to user device 204, to identify a measure of light in user device 204's environment. Then, music module 212 may deduce an activity and/or time of day based on the identified measure of light. For example, music module 212 may deduce that user 208 is preparing to go to sleep based on a decrease in an amount of light identified in user device 204's environment. In some examples, music module 212 may rely on a combination of different sensors to identify a combination of characteristics of user 208's environment. In these examples, music module 212 may determine context 216 based on the combination of characteristics.

In addition, or as an alternative, to identifying context 216 based on sensor data, in examples in which music service 214 operates within social media platform 206, music module 212 may detect context 216 based on a characteristic of user 208's environment obtained from information collected from social media platform 206. Social media platform 206 may maintain the information within a variety of different locations within social media platform 206 (e.g., within a newsfeed, a message, a profile, a contacts database, etc.). In these examples, music module 212 may detect context 216 in a variety of ways (e.g., depending on from where, within social media platform 206, the information is being maintained).

For example, in some examples, music module 212 may identify information maintained within a social media post created by user 208 (e.g., a newsfeed post and/or a stories post). In these examples, music module 212 may deduce context 216 based on the information identified within the social media post (e.g., based an analysis of text, a graphic, and/or an image included within a social media post and/or one or more comments posted to the social media post). As a specific example, the text of a social media post may express feelings of user 208 and music module 212 may deduce context 216 (i.e., an internal state of user 208) based on a textual analysis of the social media post. As another specific example, the social media post may relay an activity of user 208 (e.g., may track user 208's progression through a race or include the text "About to start running the marathon!"). In this example, music module 212 may deduce context 216 (i.e., an activity that user 208 is engaged in) based on the activity-information included within the social media post.

As another example of detecting context 216 based on information collected from social media platform 206, music module 212 may deduce context 216 (i.e., an activity of user 208) by identifying a social networking activity being performed by user 208 via social media platform 206. For example, music module 212 may deduce context 216 based on a determination that user 208 is browsing user 208's newsfeed and/or viewing a particular social media post.

As yet another example, music module 212 may detect context 216 based on a social connection (e.g., a list of contacts) maintained by social media platform 206 paired with location information for user 208 and/or contacts of user 208. In this example, music module 212 may detect context 216 by (1) identifying one or more contacts of user 208 within social media platform 206, (2) determining that user 208 is in a same environment as the identified contacts (e.g., within a designated geographical proximity of the identified contacts), and (3) deducing context 216 based on the determination.

For example, in some examples, social media platform 206 may include a friend tracking service that tracks the location of user 208's contacts and/or detects when the contacts (e.g., the contact's user devices) are within a designated geographical proximity of user device 204. In these examples, music module 212 may (1) identify information collected by the friend tracking service, (2) determine from the identified information that one or more contacts are within a designated proximity of user 208, (3) deduce that user 208 is socializing with the one or more contacts, and (4) deduce context 216 (a social setting in which user 208 is socializing with the one or more contacts) based on deducing that user 208 is socializing with the one or more contacts.

In some examples, music module 212 may detect context 216 based on information obtained from a third-party application (e.g., installed on user device 204). As a specific example, music module 212 may be configured with permission to collect information from a gaming application installed on user device 204 (e.g., a solitaire application). In this specific example, music module 212 may deduce context 216 based on information collected from the gaming application. For example, music module 212 may identify a current activity of user 208 based on information that indicates that user 208 is playing a game and/or an internal state based on information that indicates a score of user 208 while playing the game.

As another specific example, music module 212 may be configured to collect information from a global weather application and may deduce context 216 based on weather data indicating weather being experienced by user 208. As another specific example, music module 212 may be configured with permission to collect information from a calendar application installed on user device 204 and may deduce context 216 based on an event recorded in the calendar application. As yet another specific example, music module 212 may be configured with permission to collect information from a browser application installed on user device 204 and may deduce context 216 based on data indicating that user 208 is browsing the Internet and/or content being viewed during user 208's browsing.

In some examples, music module 212 may detect context 216 using information obtained from a combination of different sources. For example, music module 212 may detect context 216 using (1) information from a sensor and information from social media platform 206 and/or (2) information from social media platform 206 (e.g., obtained from social media application 210) and information from a third-party application (e.g., installed on user device 204). As a specific example, music module 212 may (1) identify a particular contact listed within a contact lists maintained for user 208 by social media platform 206 and (2) determine that a device of the particular contact is within a designated range of user device 204 based on information obtained from a third-party application installed on user device 204 (e.g., based on Bluetooth data). Then, music module 212 may deduce user 208's social setting (e.g., that user 208 is with the particular contact) based on this determination.

In certain embodiments, music module 212 may rely on a machine learning model (e.g., a neural network) to determine context 216. In these examples, music module 212 may (1) identify one or more characteristics of context 216 (e.g., the characteristics described above collected from a sensor, a social media platform, and/or a third-party application), (2) use the characteristics as inputs to the machine learning model, and (3) determine context 216 based on an output from the machine learning model.

Returning to FIG. 1, at step 130, one or more of the systems described herein may create a transient contextual queue of music including music compositions that are tailored to the current context. For example, music module 212 may create a transient contextual queue of music 218 including music compositions 220 that are tailored to context 216.

The term "music composition" may generally refer to any type or form of audio segment with musical content. In some examples, a music composition may correspond to a musical work with a distinct beginning and end, such as a song, an instrumental work, a rhythmic spoken work, etc. The term "transient contextual queue of music" may generally refer to a series of music compositions that have been automatically selected (e.g., by music module 212) for user 208 based on context 216. In some examples, transient contextual queue of music 218 may take the form of a music station. In other examples, transient contextual queue of music 218 may take the form of a playlist. In one embodiment, transient contextual queue of music 218 may be ephemeral (e.g., set to disappear once user 208 leaves context 216). Alternatively, a record of transient contextual queue of music 218 may remain accessible to user 208 once user 208 leaves context 216.

Music module 212 may select music compositions 220 to be included within transient contextual queue of music 218 (e.g., to be added to transient contextual queue of music 218) based on a variety of factors. In some examples, music module 212 may select music compositions 220 based on user history. For example, music module 212 may select music compositions 220 based on a determination that user 208 and/or other users have listened to music compositions 220, and/or additional music compositions that are musically similar to music compositions 220, when positioned in context 216 and/or a context that is similar to context 216. As a specific example, in examples in which music module 212 detects that user 208 is currently driving, music module 212 may select music compositions 220 based on a determination that user 208 and/or other users previously listened to music compositions 220, and/or additional music compositions that are musically similar to music compositions 220, while driving and/or engaged in a similar activity to driving.

Music module 212 may determine that additional music compositions are musically similar to music compositions 220 using any type or form of similarity-detection model. In some examples, music module 212 may determine that the music compositions are musically similar to music compositions 220 based on a usage analysis. For example, music module 212 may determine that the additional music compositions are musically similar to music compositions 220 based on data collected from playlists of users within a user base. As a specific example, music module 212 may rely on a determination that one of the additional music compositions is co-located in a same playlist as one of music compositions 220.

As another example, music module 212 may determine that the music compositions are musically similar to music compositions 220 based on a similar musical quality (e.g., a same or similar beat and/or tempo), a same or similar artist, and/or a same social reaction (e.g., derived from digital comments posted to social media platform 206). In some examples, music module 212 may determine the similarity using machine learning (e.g., based an output received from a neural network).

Similarly, music module 212 may determine that an additional context is similar to context 216 using any type or form of similarity-detection model. The similarity-detection model may rely on a variety of inputs, such as a characteristic of a context. In some examples, a similarity-detection model directed at determining similar music compositions and/or similar contexts may represent a machine-learning model, such as a neural network.

In some examples, music module 212 may rely on a general user history (e.g., the user history of all users within a user base) to select music compositions 220. Additionally or alternatively, music module 212 may rely on the user history of one or more specific users. As a specific example, in examples in which music module 212 detects that user 208 is socializing with one or more of user 208's contacts (e.g., is in a same environment as the contacts), music module 212 may select music compositions 220 by (1) identifying music compositions (i.e., music compositions 220) that are known or predicted to be of interest to both user 208 and at least one of the contacts and (2) selecting the identified music compositions (i.e., music compositions 220) for transient contextual queue of music 218.

In one such example, music module 212 may select specific music compositions known or predicted to be of interest to both user 208 and at least one of the contacts (e.g., by determining that a particular music composition is in a playlist of both user 208 and at least one of the contacts). Additionally or alternatively, music module 212 may (1) identify a type of music known or predicted to be of interest to user 208 and at least one of the contacts and (2) select music compositions (i.e., music compositions 220) that are of the identified type.

As another specific example of relying on the user history of specific users, in examples in which music module 212 detects that user 208's current context (i.e., context 216) is a location, music module 212 may (1) identify music compositions being listened to via the music service by other users associated with the location, and in response, (2) select the identified music compositions and/or music compositions that are similar to the identified music compositions (i.e., music compositions 220) to add to transient contextual queue of music 218. In one such example, music module 212 may determine that user 208 has arrived at a new geographic location (e.g., Paris) and may select music compositions that are specifically appropriate for an arrival to the new geographic location by (1) determining that users in the new geographic location (e.g., residents of Paris) are listening to music compositions 220 and/or music compositions that are similar to music compositions 220 and (2) selecting music compositions 220 based on the determination.

In addition, or as an alternative, to selecting music compositions 220 based on user history, music module 212 may select music compositions 220 based on a policy that manually assigns certain music compositions and/or types of music compositions to a given context. As a specific example, in examples in which music module 212 detects that user 208's internal state is one of sadness (e.g., based on content extracted from a social media post), music module 212 may select music compositions 220 in response to (1) identifying a policy that assigns music compositions 220 as sad-context compositions and/or (2) identifying a policy that assigns a certain type of music composition as a sad-context composition and then determining that music compositions 220 correspond to the certain type.

Music module 212 may determine a music composition's type using any type or form of music analysis protocol. For example, music module 212 may determine a music composition's type based on a musical quality of the music composition, such as a beat and/or tempo of the music composition. As another example, music module 212 may determine a music composition's type based on a digital social reaction to the music composition (e.g., a digital comment associated with the music composition). In one example, music module 212 may determine a music composition's type based on a machine learning output (e.g., obtained in response to providing one or more inputs to a neural network).

In certain embodiments, music module 212 may additionally tailor its music selection to user 208 specifically (e.g., based on an assumption that different users may be interested in listening to different music compositions when positioned in a given context). In these embodiments, music module 212 may tailor music compositions 220 to user 208 based on a detected characteristic of user 208. As a specific example, in examples in which music module 212 detects that a particular holiday season is approaching (e.g., the Christmas or Hanukkah season), music module 212 may select music compositions 220 based on both the identified global context and a characteristic of user 208 (e.g., a religious or ethnic tradition of user 208 indicated within a profile of user 208 within social media platform 206). As another specific example, music module 212 may select music compositions 220 based on both context 216 and a music preference of user 208.

Music module 212 may rely on a variety of factors to select music compositions that correspond to a particular characteristic of user 208 (e.g., what other users who share the characteristic have listened to when in a same or similar context, what a policy instructs to play for a user with the particular characteristic when the user is in context 216, etc.). In some examples, music module 212 may determine that music compositions 220 are tailored to user 208 using a machine learning model (e.g., a neural network).

In some embodiments, music module 212 may, in response to detecting context 216 and/or creating transient contextual queue of music 218, alter a face of a persistent music entry point to music service 214 (e.g., persistent entry point 302 described above) to correspond to the detected context (i.e., context 216). In these embodiments, the persistent music entry point may be configured to navigate to a portion of music service 214 that corresponds to transient contextual queue of music 218 while in the altered configuration. Using FIGS. 3A-3B as a specific example, in an example in which music module 212 detects that user 208 is in a driving context, music module 212 may alter a persistent entry point 302 from a default graphic of a music note to a driving graphic.

Additionally or alternatively, music module 212 may, in response to detecting context 216 and/or creating transient contextual queue of music 218, transmit a transient music entry point, which navigates to a portion of music service 214 that corresponds to transient contextual queue of music 218. For example, music module 212 may transmit a push notification with a suggestion to navigate to music service 214 in order to listen to music that relates to context 216. The term "push notification" may refer generally to any type or form of selectable message (e.g., pop-up) presented within a display element of user device 204. These push notifications may include a variety of content, depending on a context that triggered music module 212 to transmit the push notification.

Figure 4:
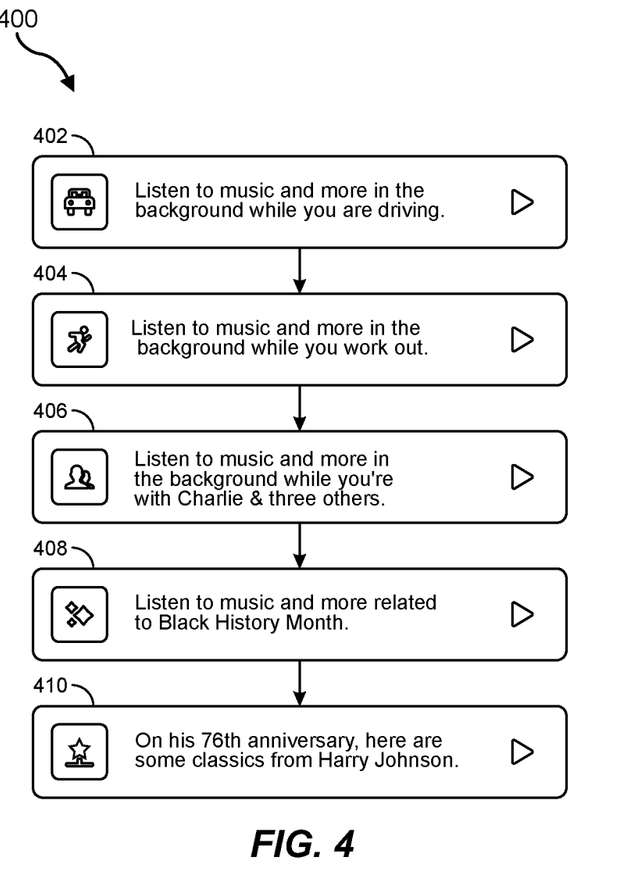
FIG. 4 is an illustration of exemplary transient entry points (e.g., push notifications) corresponding to a collection of different transient contextual queues of music.

FIG. 4 provides a collection of exemplary push notifications 400 that correspond to transient contextual queues of music created for a variety of different contexts, each of which will be described, in turn. First, push notification 402 corresponds to a transient contextual queue created for a driving context and includes the text "Listen to music and more in the background while you are driving." Next, push notification 404 corresponds to a transient contextual queue created for an exercising context and includes the text "Listen to music and more in the background while you work out." Next, push notification 406 corresponds to a transient contextual queue created for a sociality context (e.g., a person or group of people a user is with) and includes the text, "Listen to music and more in the background while you're with Charlie & three others." Next, push notification 408 corresponds to a transient contextual queue created for a global event and includes the text, "Listen to music and more related to Black History Month." Finally, push notification 410 corresponds to a transient contextual queue created for an historic event and includes the text, "On his 76$^{th}$ anniversary, here are some classics from Harry Belafonte."

The transient music entry point may be superimposed over various interfaces that are displayed via a display element of user device 204. In one example, a transient music entry point may be superimposed over an interface provided by social media platform 206. For example, FIG. 5A illustrates a newsfeed interface 504 over which push notification 402 from FIG. 4 has been superimposed. In another example, a transient music entry point may be superimposed over a locked screen and/or a home screen of user device 204. In another example, a transient music entry point may be superimposed over a third-party application that operates in conjunction with social media platform 206 and/or music service 214.

Finally, at step 140, one or more of the systems described herein may play, via the user device, one or more music compositions from the transient contextual queue of music while the user is detected to be within the current context. For example, music module 212 may play, via user device 204, one or more music compositions 220 from transient contextual queue of music 218 while user 208 is detected to be within context 216.

Music module 212 may provide transient contextual queue of music 218 in response to a variety of triggers. For example, in examples in which music module 212 provides a transient music entry point (such as the push notifications discussed in connection with step 130), music module 212 may provide transient contextual queue of music 218 in response to receiving user input selecting the transient music entry point. Using FIGS. 5A and 5D as a specific example, music module 212 may (1) receive user swiping input to push notification 402 as depicted in FIG. 5A and (2), in response to receiving the input, provide transient contextual queue of music 218 within player interface 500, as depicted in FIG. 5D.

As another example, in examples in which music module 212 alters the face of a persistent entry point to music service 214 (e.g., persistent entry point 302) to correspond to transient contextual queue of music 218, music module 212 may provide transient contextual queue of music 218 (e.g., by providing a player interface configured to play music compositions 220) in response to receiving user input selecting the altered persistent entry point.

In other examples, music module 212 may provide transient contextual queue of music 218 automatically in response to detecting context 216. For example, music module 212 may automatically play music compositions within transient contextual queue of music 218 in response to detecting context 216 (e.g., in instances in which user 208 has selected a setting that authorizes music service 214 to automatically play context-detected queues of music.

Music module 212 may provide transient contextual queue of music 218 in a variety of ways. In some examples, music module 212 may provide an interface with a written description of transient contextual queue of music 218 (e.g., a list of music compositions within the queue). Additionally or alternatively, music module 212 may play the music compositions within transient contextual queue of music 218 and/or cause the music compositions to be played. In one such example, music module 212 may provide and/or operate in conjunction with a music player (e.g., a media player).

The term "music player" may generally refer to any type or form of application software, provided and/or utilized by music service 214, that is configured to play multimedia files (e.g., audio files) provided via music service 214. In some examples, the music player may be user-operable via a player interface, such as player interface 500 illustrated in FIGS. 5B-5D. In these examples, the player interface may be presented in a full-screen mode, as illustrated in FIG. 5D, which may be minimizable or dismissible, as illustrated in FIGS. 5B-5C. The minimized player interface may provide a minimal amount of information. For example, the minimized player interface may only (1) display a title of a music composition currently playing and/or (2) provide user controls allowing the user to pause the playing and/or skip forward and/or backward to other music compositions.

The full-screen interface may additionally provide user 208 with options for managing transient contextual queue of music 218 (e.g., bookmarking a song, liking a song, etc.). In contrast to the minimal amount of information displayed in the minimized interface, the full-screen interface may be more content intensive. For example, a full-screen interface may display a music composition currently being played and/or currently in queue to be played, one or more additional music compositions from transient contextual queue of music 218, a graphic such as an album cover for music compositions being displayed, selections to share music, etc. In some examples, a player interface may include a broadcasting element, such as broadcasting element 502 illustrated in FIG. 5D, that may enable a user to broadcast what the user is listening to via the media player to one or more additional users. The transient contextual queues of music described above provide a number of advantages. In some examples, the disclosed queues of music may facilitate passive consumption, enabling users to discover music while off-screen that is relevant to the events and states experienced in everyday life. By tailoring the queues of music to specific contexts, the disclosed systems and methods may also improve the relevancy of recommended listening content to a user's needs.

As described throughout the present disclosure, the disclosed systems and methods may provide systems and methods for creating and providing transient contextual queues of music. In one example, a computer-implemented method may include (1) providing a user of a device with a music service, (2) detecting a current context of the user, the current context including a characteristic of the user's environment, (3) creating a transient contextual queue of music (e.g., a music station and/or a playlist) that includes music compositions that are tailored to the current context, and (4) playing, via the device, one or more music compositions from the transient contextual queue of music while the user is detected to be within the current context.

In some examples, the current context may represent an activity, an internal state, and/or an event. In additional or alternative examples, the current context may represent a location. In these examples, creating the transient contextual queue of music may include (1) identifying music compositions being listened to via the music service by other users within the location and (2) adding the identified music compositions to the transient contextual queue of music.

In one embodiment, the user may be a member of a social media platform and providing the music service may include providing the music service as part of the social media platform. In this embodiment, detecting the current context may include identifying one or more contacts of the user within the social media platform and determining that the user is in a same environment as the identified contacts.

In this same embodiment, determining that the user is in the same environment may include determining that the user is within a designated geographical proximity of the identified contacts. Additionally or alternatively, creating the transient contextual queue of music may include (1) identifying music compositions known or predicted to be of interest to both the user and at least one of the identified contacts and (2) adding the identified music compositions to the transient contextual queue of music.

In one example, the method may further include, while the user is detected to be within the current context, providing, within an interface provided by the social media platform, a transient music entry point that navigates to the transient contextual queue of music. In another example, the method may include (1) providing, within an interface provided by the social media platform, a persistent music entry point that navigates to an interface of the music service and, while the user is detected to be within the current context, altering a face of the persistent music entry point to correspond to the current context.

In one example, a corresponding system for implementing the above-described method may include a music module, stored in memory that (1) provides a user of a device with a music service, (2) detects a current context of the user, the current context including a characteristic of the user's environment, (3) creates a transient contextual queue of music including music compositions that are tailored to the current context, and (4) plays, via the device, one or more music compositions from the transient contextual queue of music while the user is detected to be within the current context. The system may also include a physical processor configured to execute the music module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a user of a device with a music service, (2) detect a current context of the user, the current context including a characteristic of the user's environment, (3) create a transient contextual queue of music including music compositions that are tailored to the current context, and (4) play, via the device, one or more music compositions from the transient contextual queue of music while the user is detected to be within the current context.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a user of a device with a music service of a social media platform, wherein the user is a member of the social media platform;
   detecting a current context of the user, the current context comprising a characteristic of the user's environment, wherein detecting the current context comprises (1) identifying one or more contacts of the user within the social media platform and (2) determining that user is in a same environment as the identified contacts;
   creating a transient contextual queue of music comprising music compositions that are tailored to the current context; and
   playing, via the device, one or more music compositions from the transient contextual queue of music while the user is detected to be within the current context.

2. The computer-implemented method of claim 1, wherein
   determining that the user is in the same environment as the identified contacts comprises determining that the user is within a designated geographical proximity of the identified contacts.

3. The computer-implemented method of claim 1, wherein creating the transient contextual queue of music comprises:
   identifying music compositions known or predicted to be of interest to both the user and at least one of the identified contacts; and
   adding the identified music compositions to the transient contextual queue of music.

4. The computer-implemented method of claim 3, wherein identifying music compositions known or predicted to be of interest to both the user and at least one of the identified contacts comprises identifying a music composition that is in a playlist of both the user and the at least one identified contact.

5. The computer-implemented method of claim 3, wherein identifying music compositions known or predicted to be of interest to both the user and at least one of the identified contacts comprises (1) identifying a type of music known or predicted to be of interest to both the user and the at least one identified contact and (2) selecting a music composition that is of the identified type.

6. The computer-implemented method of claim 1, wherein:
detecting the current context further comprises identifying a location; and
creating the transient contextual queue of music comprises:
identifying music compositions being listened to via the music service by other users within the location; and
adding the identified music compositions to the transient contextual queue of music.

7. The computer-implemented method of claim 1, wherein detecting the current context further comprises detecting at least one of:
an activity in which the user is engaged;
an internal state of the user; or
an event being attended by the user.

8. The computer-implemented method of claim 1, wherein detecting the current context of the user further comprises detecting the current context based on content extracted from a social media post posted by the user to the social media platform.

9. The computer-implemented method of claim 1, further comprising, while the user is detected to be within the current context, providing, within an interface provided by a social media platform, a transient music entry point that navigates to the transient contextual queue of music.

10. The computer-implemented method of claim 1, further comprising:
providing, within an interface provided by a social media platform, a persistent music entry point that navigates to an interface of the music service; and
while the user is detected to be within the current context, altering a face of the persistent music entry point to correspond to the current context.

11. The computer-implemented method of claim 1, wherein the transient contextual queue of music comprises at least one of:
a music station; or
a playlist.

12. A system comprising:
a music module, stored in memory, that:
provides a user of a device with a music service of a social media platform, wherein the user is a member of the social media platform;
detects a current context of the user, the current context comprising a characteristic of the user's environment, wherein detecting the current context comprises (1) identifying one or more contacts of the user within the social media platform and (2) determining that user is in a same environment as the identified contacts;
creates a transient contextual queue of music comprising music compositions that are tailored to the current context; and
plays, via the device, one or more music compositions from the transient contextual queue of music while the user is detected to be within the current context; and
at least one physical processor configured to execute the music module.

13. The system of claim 12, wherein determining that the user is in the same environment as the identified contacts comprises determining that the user is within a designated geographical proximity of the identified contacts.

14. The system of claim 12, wherein creating the transient contextual queue of music comprises:
identifying music compositions known or predicted to be of interest to both the user and at least one of the identified contacts; and
adding the identified music compositions to the transient contextual queue of music.

15. The system of claim 14, wherein identifying music compositions known or predicted to be of interest to both the user and at least one of the identified contacts comprises identifying a music composition that is in a playlist of both the user and the at least one identified contact.

16. The system of claim 14, wherein identifying music compositions known or predicted to be of interest to both the user and at least one of the identified contacts comprises (1) identifying a type of music known or predicted to be of interest to both the user and the at least one identified contact and (2) selecting a music composition that is of the identified type.

17. The system of claim 12, wherein:
detecting the current context further comprises identifying a location; and
creating the transient contextual queue of music comprises:
identifying music compositions being listened to via the music service by other users within the location; and
adding the identified music compositions to the transient contextual queue of music.

18. The system of claim 12, wherein detecting the current context of the user further comprises detecting the current context based on content extracted from a social media post posted by the user to the social media platform.

19. The system of claim 12, wherein the transient contextual queue of music comprises at least one of:
a music station; or
a playlist.

20. A non-transitory computer-readable medium comprising one or more computer-readable instructions that, when executed by at least one processor of a computing device, cause the computing device to:
provide a user of a device with a music service of a social media platform, wherein the user is a member of the social media platform;
detect a current context of the user, the current context comprising a characteristic of the user's environment, wherein detecting the current context comprises (1) identifying one or more contacts of the user within the social media platform and (2) determining that user is in a same environment as the identified contacts;
create a transient contextual queue of music comprising music compositions that are tailored to the current context; and play, via the device, one or more music compositions from the transient contextual queue of music while the user is detected to be within the current context.

* * * * *